UNITED STATES PATENT OFFICE.

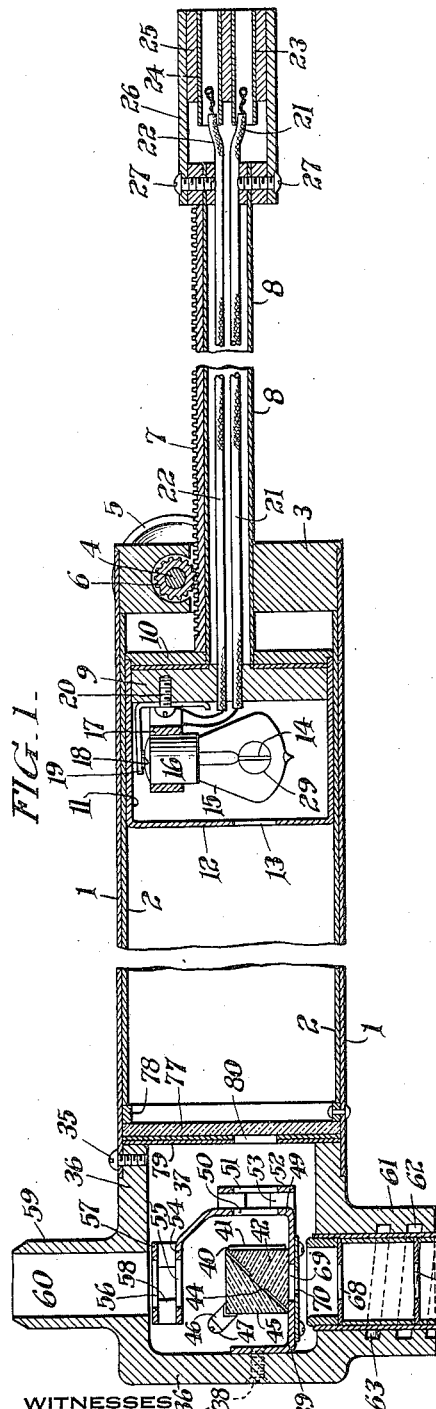
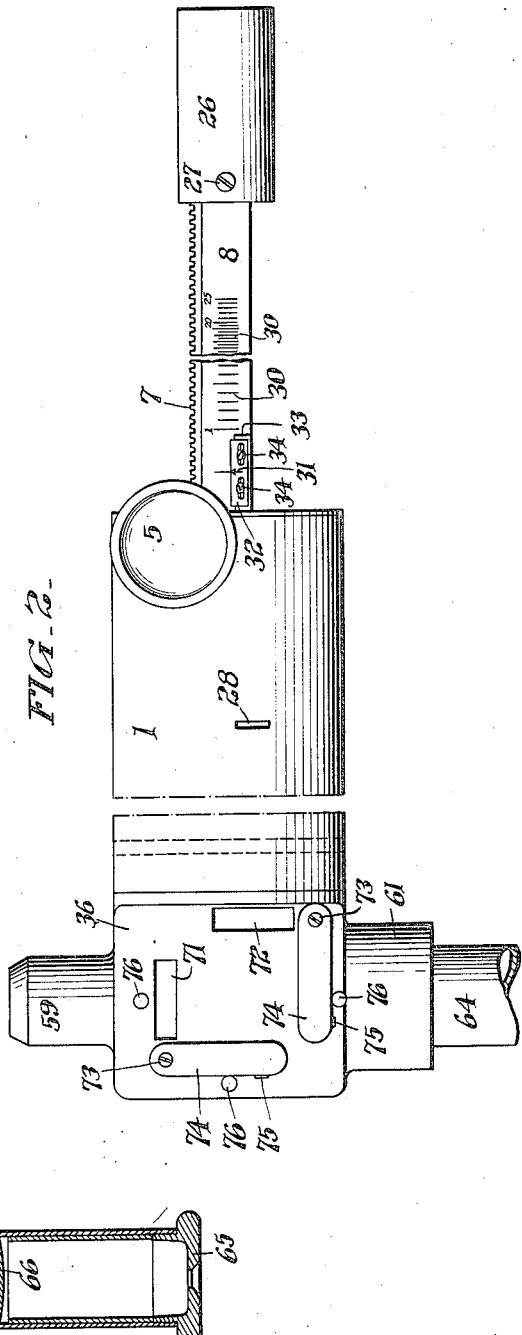

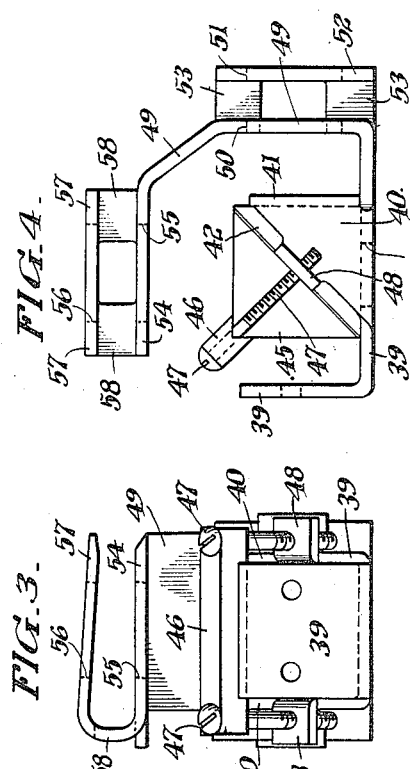

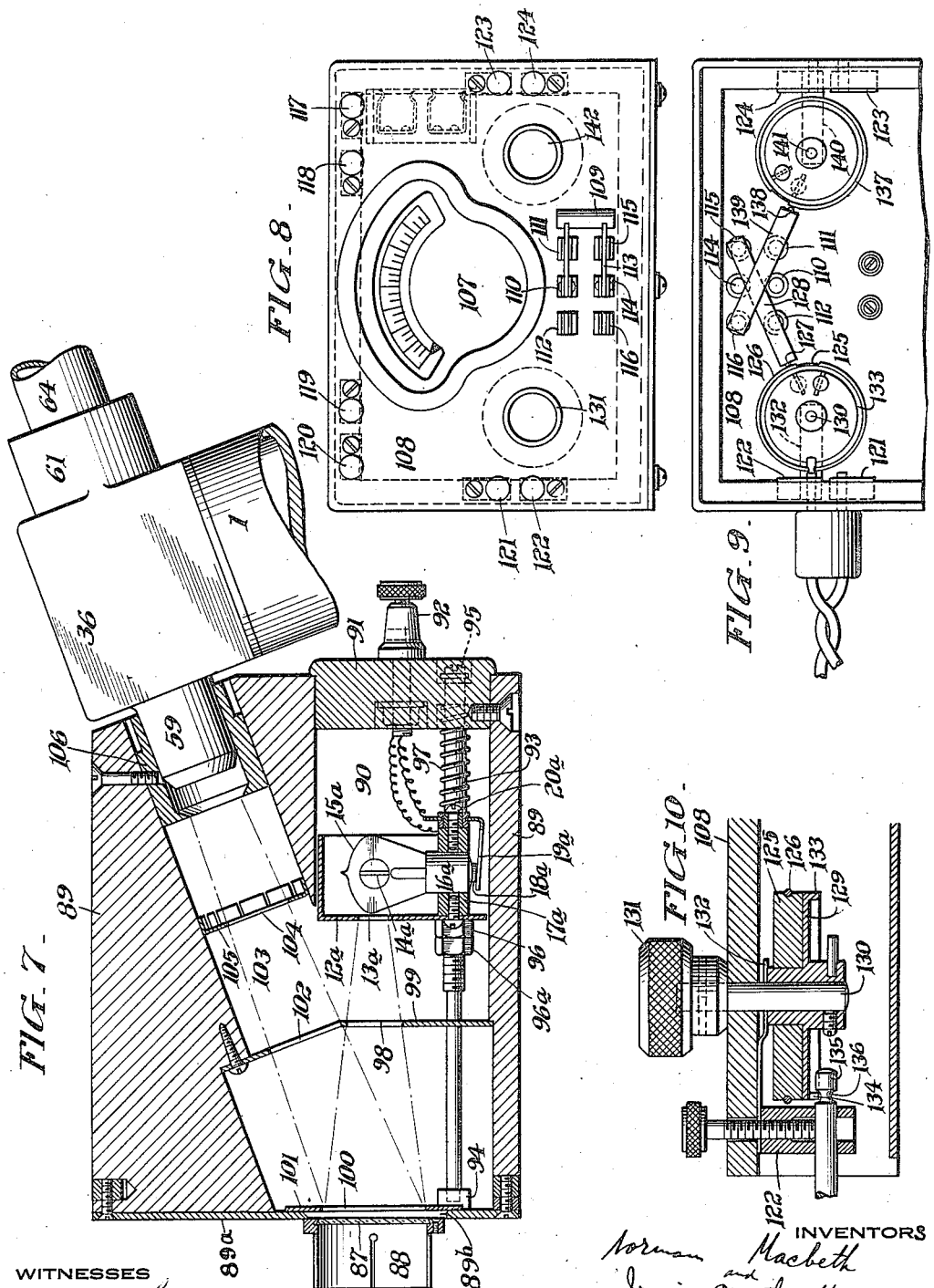

NORMAN MACBETH, OF NEW YORK, N. Y., AND IRVING B. SMITH, OF AMBLER, PENNSYLVANIA, ASSIGNORS TO THE LEEDS & NORTHRUP COMPANY, OF PHILADELPHIA, PENNSYLVANIA, A CORPORATION OF PENNSYLVANIA.

ILLUMINOMETER.

1,252,598.            Specification of Letters Patent.        Patented Jan. 8, 1918.

Application filed March 30, 1915. Serial No. 18,206.

*To all whom it may concern:*

Be it known that we, NORMAN MACBETH and IRVING B. SMITH, a subject of the King of Great Britain and a citizen of the United States, respectively, of New York and Ambler, counties of New York and Montgomery, States of New York and Pennsylvania, respectively, have invented new and useful Improvements in Illuminometers, of which the following is a specification.

Our invention relates to photometric apparatus suitable for the measurement of illumination or brightness, as, for example, the intensity of illumination, usually to be measured in foot-candles, in a room, hall, theater, or the like; and suitable also for the measurement of candle power of a source of light.

Our apparatus includes an illuminometer, which is preferably portable, and comprises a Lummer Brodhun cube or prism pair through a part of which the surface whose intensity of illumination is to be determined is directly viewed by a telescope and one prism of which reflects light from a source into the telescope, the light source being adjustable as to its distance from the prism and a suitable scale being provided and having markings for the different positions of the light source, the markings reading generally in foot-candles.

Our invention resides in such an illuminometer which is light in weight, and therefore easily portable, compact, accurate, and of simple construction, the features of the illuminometer being hereinafter described.

Our apparatus includes also a controller comprising means for calibrating the aforementioned source of light, which is a working standard, with a reference standard. The controller comprises a milliammeter or other suitable means for measuring current strength, together with means for bringing the same into circuit with either the working standard or the reference standard, and means for introducing into the circuit from which the milliammeter is removed a resistance equal to the resistance of the milliammeter, thus avoiding a change in strength of the current through either lamp and the necessity for two current measuring instruments.

Our apparatus includes also suitable means for mounting or containing the reference standard with means for associating therewith the illuminometer in making a calibration or standardizing the working standard.

Our invention resides in the apparatus hereinafter described and defined in the claims.

For an illustration of one of the forms our invention may take, reference is to be had to the accompanying drawings, in which:

Figure 1 is a longitudinal sectional view through the illuminometer, some parts shown in elevation.

Fig. 2 is a side elevational view of the same.

Fig. 3 is an end elevational view of the cube or prism pair mounting and associated parts.

Fig. 4 is a side elevational view of the same.

Fig. 5 is a view of the face of one of the prisms.

Fig. 6 is a fragmentary end view of the illuminometer with a horn, in section, attached thereto.

Fig. 7 is a longitudinal sectional view of the reference standard apparatus showing the illuminometer in association therewith.

Fig. 8 is a top plan view of the controller.

Fig. 9 is a bottom plan view of parts of the same.

Fig. 10 is a fragmentary longitudinal sectional view, on enlarged scale, of part of the controller mechanism.

Fig. 11 is a diagrammatic view illustrating the electrical circuits employed in standardizing and operating the illuminometer.

Referring to Figs. 1 to 5 inclusive, 1 is a tube or light excluding chamber, as of aluminum, having the lining 2 of black fabric or other material incapable of reflecting light. In one end of the tube 1 is the plug 3 in which the shaft 4 is rotatable, the shaft carrying on its outer ends the knurled handles 5 and at its middle a pinion 6 meshing with the rack 7 disposed upon the tube 8 movable longitudinally through the plug 3 and carrying at its inner end within the tube 1 the lamp carriage 9 which is secured to the disk 10 secured upon the end of the tube 8. By the carriage 9 is carried the cylindrical metallic shell 11 movable like a piston longitudinally within the lining 2 of the tube 1. The end 12 of the shell 11 has an aperture 13 opposite which within the shell 11 is the filament 14 of a small electric incandescent lamp 15 whose metallic shell base 16 forms one terminal of the filament 14 and is held by and makes electrical connection with the metallic bracket 17 supported on the member 9 of insulating material. The other terminal of the filament 14 is at the button 18 with which the spring 19 engages, the spring 19 being held by screw 20 to the member 9. The electric lamp 15 is the working standard. With the bracket 17 and the spring 19 are connected the insulated wires or conductors 21 and 22 which extend through the tube 8 and terminate in the metallic tubes or sockets 23 and 24 insulated from each other and supported in the insulating bushing 25 in the metallic tube 26 which is secured by screws 27 to the tube 8.

In the tube 1 are the slits or apertures 28 opposite to each other and in the cylindrical wall of shell 11 are circular apertures 29, opposite each other, which apertures may be brought into alinement with the apertures 28, whereby the filament 14 may be observed.

The tube 8 is preferably square and carries on its one face the scale 30 with which coöperates the pointer 31 on the plate 32 carried on the lug or projection 33 on the plug 3. The plate 32 is secured to the lug 33 by screws 34 extending through the elongated slots in the plate 32, these slots permitting slight longitudinal adjustment of the pointer 31.

Due to the fact that the working standard lamps will not all be exactly alike, particularly as to location or shape of filament, due to variations in manufacture, the filament of the working standard is viewed through the slits 28 in alinement with the holes 29 and the lamp so turned and its position so adjusted with the knob 5 that the filament 14 comes into alinement with the lower edges, as viewed in Fig. 2, of the slits 28. When so positioned the filament is in correct position, with respect to the scale and the pointer plate 32 is then so adjusted longitudinally of the lug 33 that the pointer 31 comes opposite a predetermined mark on the tube 8, in which position the plate 32 is then clamped by the screws 34.

At its other end the tube 1 is secured by screws 35 to the head 36 which may be conveniently molded of suitable material such as a condensation product, as for example, condensite or bakelite.

The head 36 has the chamber 37 within which is secured by screws 38 the metal bracket 39 having the triangular shaped cheeks 40 having the inturned edges 41. Between the cheeks 40 is disposed the prism 42 with its vertical face, Figs. 1 and 4, against the inturned flanges 41. On its face 45 degrees to the vertical the prism 42 has an integral projection 44 which is elliptical in shape as indicated in Fig. 5. Resting against the part 44 of prism 42 is the 45 degree face of the second prism 45 of the Lummer Brodhun cube or prism pair. The two prisms are clamped in engagement with each other by the block 46 engaging the corner of the prism 45, screws 47 engaging in the lugs 48 on the cheeks 40 serving to draw the block 46 against the prism 45 and thereby hold it in contact with the projection 44 of prism 42, leaving a slight gap between the prism faces, excepting that portion which has the elliptical contour.

Integral with the bracket 39 is the vertical piece 49 having the apertures 50 in alinement with which is the aperture 51 in the plate 52 joined to the member 49 by the lateral webs 53. Carried by the plate 49 is the plate 54 having the aperture 55 in alinement with which is the aperture 56 in the plate 57 tied to the plate 54 by the webs 58.

The head 36 has a tubular projection 59 having the sighting aperture 60. The head 36 has also the hollow lug 61 having the internal screw thread 62 in which engages the pin 63 upon the telescope tube 64, whereby turning said tube 64 adjusts the same toward or away from the prisms. The telescope 64 has the eye piece 65, the objective or lens 66 and the diaphragms 67 and 68. The plate or bracket 39 has the aperture 69 over which may be placed the diaphragm 70.

The sighting aperture 60, the apertures 56, 55, the prisms 42 and 45, and particularly the elliptical projection 44 on prism 42, and the diaphragm 70 are all in alinement with each other in the optical axis of the telescope; and the apertures 50 and 51 are in alinement with the projection 44 on the prism 42 and with the aperture 13 and lamp filament 14.

The head 36 has the rectangular aperture 71, Fig. 2, through which may be inserted a screen into the space between the plates 54 and 57 against the webs 58. And there is a similar aperture 72 through which may be inserted a screen into the space between the plates 49 and 52 against the webs 53. Pivoted to the head 36 at 73 is a metal plate 74, having the finger clip 75, which may be swung over the aperture 71 to exclude light from the chamber 37 or to hold the screen in position. There is a similar plate for the aperture 72. Lugs 76 on the member 36 serve to limit the travel of the members 74.

In the end of the tube 1 there is a glass screen 77 confined between the ring 78 and the diaphragm plate 79 having the diaphragm aperture 80 in alinement with apertures 13, 50 and 51.

The operation is as follows:

Upon a tripod or any other suitable support is placed a test plate at the place where the illumination or brightness of light is to be measured. Such a test plate may be of glass with a suitably finished unpolished surface, generally white or nearly so, which will reflect light into the sighting aperture 60 of the illuminometer.

The reflecting surface of the test plate should preferably be of a material whose co-efficient of reflection is as nearly as possible independent of the angle of incidence of the light falling upon it or the position from which it is observed.

The current strength through the filament 14 of the working standard lamp is adjusted, by means hereinafter referred to, to a predetermined value.

The telescope 64 is then focused upon the prism interface or nearly so giving a fairly sharp image of the contacting elliptical field and its surrounding field, the fields, however, being circular, due to the angular view of the elliptical projection 44. Then the knurled handle 5 operating pinion 6 is turned to move the lamp carriage longitudinally within the tube 1 until the brightness of the circular field of light from the test plate is the same as the brightness of the field of light around such circle, in which case, assuming no color differences, the two fields will merge and become one and of the same brightness. Opposite the pointer 31 there then is read on scale 30 the number of foot-candles, or other units, of brightness of illumination of the test plate.

The light from the filament 14 passes through a vertical face of the prism 42 and that part striking the 45 degree face of the prism 42 around the projection 44 will be reflected into the telescope, while the light passing from the source 14 through the projection 44 will pass directly thereover and through the prism 45 to the wall of the chamber 37, such fraction of the light having no function. When the lamp carriage has not been adjusted to balancing position, there will appear to the eye of the observer a small circle of light due to the light transmitted from the test plate through prism 45 and projection 44 on the prism 42. All the other light from the test plate striking the prism 45 will be totally reflected therefrom at its 45 degree face. As stated, when the light source 14 has been adjusted to proper position the two concentric circles of light will no longer be distinguishable, if they are of the same color, but will merge into each other, whereupon the reading is taken upon the scale 30.

When the intensity of illumination is too high or too low to be read directly on the scale of the illuminometer, an absorbing screen of neutral or colored glass may be employed. If the intensity of illumination under observation is too high, the absorption screen is inserted in the slot 71, that is, between the test plate or other surface under observation and the prism pair. The intensity of illumination is therefore reduced, and when the instrument is balanced and a reading taken on the scale 30, that reading is multiplied by a suitable factor corresponding with the co-efficient of transmission of the inserted screen. If, on the other hand, the intensity of illumination of the test plate or other object under observation is very low and under the range of the scale 30, the screen may be placed in the slot 72, thus reducing the amount of light from the filament 14 reaching the prism pair. The instrument is then balanced and the reading on the scale 30 is divided by the same factor, if the same screen is used, or multiplied by the reciprocal of that factor.

When it is desired to make brightness measurements on ceilings or other surfaces, the illuminometer may be held in its normal or usual position while viewing these surfaces, but in such case a horn 81, Fig. 6, is attached to the member 59 of the illuminometer as by set screw 82. The horn is apertured at its elbow, the aperture being closed by a plate 83 carrying the mirror 84, diaphragms 85 and 86 being provided within the horn whose vertical leg is directed toward the surface or the ceiling the brightness of whose illumination is to be measured.

Inasmuch as the mirror 84 absorbs part of the light impinging thereon, the working standard filament 14 must be operated at slightly lower current strength, suitably determined, to compensate for this mirror absorption.

When it is preferred to employ a translucent test plate, in place of the opaque test plate heretofore referred to, the cap 88, carrying the translucent test plate 87, is slipped on to the upper end of the horn 81. A different current value for the working standard filament 14 will be required when using test plate 87. When determining this current strength, the cap 88 carrying the plate 87, is brought into register with the aperture 89$^b$ in plate 89$^a$, as shown in Fig. 7.

In making measurements under conditions of great differences in color between the light emitted by the working standard and the light under examination which will accordingly produce different colors in the two concentric fields of the Lummer Brodhun cube, this being particularly the case when daylight measurements are made, special screens or filters are provided for producing a color match. When using such filters or screens a new factor must be employed in interpreting the reading from the scale 30, such factor being certified by the maker of the filter or screen.

It will be noted that the screen 77 receives the light from the filament 14, and that part of the screen 77 at the diaphragm aperture 80 becomes in effect a secondary source of illumination which impinges upon the prism 42.

In Fig. 7 is shown the reference standard apparatus which comprises means for standardizing or calibrating the illuminometer. This apparatus comprises the light excluding housing 89, preferably hard wood, having the chamber 90 closed by the plug 91 carrying the binding posts 92 one of which connects with the metallic block 17$^a$ in which is clamped the metallic shell base 16$^a$ of the reference standard lamp 15$^a$ having the filament 14$^a$ whose one terminal is connected to the base 16$^a$ and whose other terminal is connected to the button contact 18$^a$ engaged by the spring contact 19$^a$ connected to the other binding post 92. The spring 19$^a$ is held to the block 17$^a$ by the screw 20$^a$ and insulated from that block. Carried by the block 17$^a$ is the shade 12$^a$, inclosing lamp 15$^a$, and having the diaphragm opening 13$^a$. The block 17$^a$ is screw threaded upon the rod 93 whose one end is thrust against the bottom of a hole in block 94 and which is supported at its other end by the plug 91, the end of the rod 93 being slotted at 95 to receive a screw driver for rotating the same. Upon the rod 93 is the nut 96 locked by the nut 96$^a$, which limits the travel of the lamp carriage toward the left on the rod. A spring 97 thrusts against the inside of the plug 91 and against the lamp carriage, thus thrusting the rod 93 toward the left against block 94. By turning the rod 93 as by a screw driver the lamp carriage moves to right or left on the screw threaded rod to determine with nicety the distance of its filament 14$^a$ from the test plate placed against the left hand wall 89$^a$ of housing 89 or from the translucent plate 87 held by cap 88 at aperture 89$^b$. In alinement with the filament 14$^a$ and the diaphragm opening 13$^a$ is a diaphragm aperture 98 in the plate 99 and a diaphragm aperture 100 in the plate 101. In the plate 99 is a second diaphragm aperture 102 in the axis of the chamber 103 in member 89. In this chamber is a second diaphragm aperture 104 in the plate 105. At the outer end of the chamber 103 is a bushing 106 adapted to receive the member 59 of the illuminometer.

The controller, Figs. 8 to 10, is a piece of apparatus comprising the milliammeter or other current measuring instrument 107 mounted upon a suitable base 108 on which is disposed the double throw double pole switch 109 whose one switch blade is pivoted to the terminal 110 and adapted to engage either of the contacts 111 or 112 while its other blade 113 is pivoted to the terminal 114 and is adapted to engage either of the terminals 115 or 116. Upon the base 108 are mounted the binding posts 117 to 120 inclusive to which the battery leads may be connected. On one side of the base are the plug sockets 121 and 122 and on the other side the plug sockets 123 and 124. Near the plug socket 122 and on the under side of base 108 is disposed the circular block 125 of insulating material in a circumferential groove in which is disposed the helical resistance conductor 126 in engagement with which is the contact 127 connected by strip 128 with the switch terminals 112 and 115. The insulating block 125 is secured upon the member 129 secured to the vertical shaft 130 extending through the base 108 and having at its upper end the handle 131. One end of the resistance conductor 126 is connected to the metallic member 129 with which electrical connection is maintained by spring contact 132 joined to plug socket member 122. The member 129 has a downwardly extending flange 133 which has a slot at 134 so that the plug 135 may be inserted when the member 129, and therefore the resistance conductor 126, is in a predetermined position. The plug 135 has a depression 136 of depth sufficient to allow the flange 133 to move through the same when the plug 135 has reached the position indicated in Fig. 10. The slot 134 is so positioned in flange 133 that the plug 135 cannot be inserted unless all or nearly all of the resistance 126 is in circuit. Near the plug socket 124 on the other side of the base 108 is situated a similar rheostat comprising resistance conductor 137 engaged by contact 138 which is connected by strip 139 with the switch terminals 111 and 116, connection being made from one end of the resistance conductor 137 with the block 124 by the strip 140. This rheostat may also be provided with a slotted flange for prevention of insertion of the plug except when the resistance conductor is in predetermined position with respect to its contact 138. The resistance conductor is rotated by the shaft 141 having above the base 108 the handle 142.

The plug socket members 121 and 123 are connected to the binding post 117 with which is connected one terminal of a battery 143 whose other terminal is connected to the binding post 118. See Fig. 11. If a greater number of cells of battery is employed, connection will be made to either binding post 119 or binding post 120, according to the number of cells employed, and there will be no connection to binding post 118. When a greater number of cells is employed one or both of the resistances 144 and 145 is or are in circuit. One terminal of the milliammeter 107 is connected to the binding post 118 and its other terminal is connected to the switch terminal 110. 146 is a resistance equal to the resistance of the instrument 107, and its one terminal is connected to the binding post 118 and its other terminal to the switch terminal 114.

The illuminometer is standardized or calibrated as follows:

When translucent test plate 87 with cap 88 is used the same is placed against the member 89ª, Fig. 7, and viewed through the illuminometer and horn. Or if an opaque test plate is used, the member 88 is removed and the opaque plate placed across the aperture from which the member 88 has been removed. The illuminometer is in the latter case placed in the position indicated in Fig. 7. In both cases the surfaces illuminated by filament 14ª are at exactly the same distance from the filament. Connections are made by a cord and plugs from binding posts 92, 92 to the plug socket members 121 and 122 or 123 and 124. The plug cannot be inserted in member 122 unless the rheostat 126 is in such position that all or nearly all of its resistance is in circuit. This prevents current of too great a strength being accidentally passed through the reference standard lamp 15ª. From the terminals 123 and 124 connection is made by cords terminating in plugs which are inserted in the plug receptacles 23 and 24, Fig. 1, on the illuminometer; or from terminals 121 and 122 connection is made to binding posts 92, 92 on the apparatus shown in Fig. 7. When the connection is to terminals 123 and 124 the rheostat 137 may likewise be in such position that the undue current cannot pass through the working standard lamp 15. The switch 109 is thrown to the left, in which case terminals 110 and 112 will be connected, and terminals 114 and 116 will be connected. Current will accordingly flow from one terminal of the battery 143 through the reference standard lamp 15ª to one terminal of the rheostat resistance 126, through contact 127 to switch contact 112, to switch contact 110, thence through the milliammeter 107 to the other terminal of the battery. The handle 131 of the rheostat is accordingly turned until the rheostat 126 adjusts the strength of current through the lamp 15ª to a predetermined or certified value to cause illumination of the screen to be of a known or predetermined brightness or intensity. This current value is certified with the lamp 15ª and has reference to use with any screen or test plate. The switch 109 is then thrown into its other position, whereupon contacts 110 and 111 will be connected, and contacts 114 and 115 will be connected, with the result that now the resistance 146 takes the place of the instrument 107 in the circuit of the lamp 15ª, and the instrument 107 takes the place of the resistance 146 in the circuit of the working standard lamp 15. Under these conditions the same current is now flowing through the lamp 15ª that was flowing when the instrument 107 was in its circuit. The handle 142 is now turned to such position that the rheostat 138 adjusts the current strength through lamp 15 to such value that the lamp 15, having been adjusted to such position longitudinally of the tube 1 that the indicator 31 points to a predetermined marking on the scale 30, is glowing at such intensity that with the illuminometer setting referred to, the intensity of the two fields, as viewed through the telescope 64, is the same. The marking on scale 30 to which lamp 15 is set is the number of foot-candles known to be the illumination of the test plate by filament 14ª. The reading of such current strength is then taken on the instrument 107 and noted.

The illuminometer is then removed from the reference standard apparatus, and electrical connection from said apparatus with the controlling apparatus is removed, and the operator can then make readings of illumination or brightness by the illuminometer by carrying with him the controller apparatus and the battery. In making an observation he first adjusts the strength of the current through the lamp 15 in the manner above described, and then the observation with the test plate which was placed at aperture 89ᵇ when making this current adjustment is made, or observations of ceilings or walls enable the illumination to be determined at any place where this test plate may be held.

In the reference standard apparatus it will be noted that the optical axis of the illuminometer is at an acute angle with respect to the axis from the lamp filament 14ª through the diaphragm apertures 13ª and 98. This is to insure no or very slight error due to the nature of the test plate employed, because with all known test plates the extent of error increases with increase in the angle between the two axes referred to. This angle and the angle at which the light from filament 14ª strikes the test plate are, furthermore, so chosen as to exclude or prevent direct or specular reflection of the light from filament 14ª to the illuminometer; that is to say, that angle between the illuminometer and the filament 14ª is so chosen as to be different from, and in the example illustrated less than, the angle at which direct or specular reflection occurs, the angle for specular or direct reflection being that in which the angle of incidence is equal to the angle of reflection.

The candle power of a lamp or any light source may be measured by the illuminometer by placing the test plate in a plane normal to the line from the light source to the test plate, the source and test plate being separated by a known distance. Suitable means should be employed to keep all light from the test plate except that emanating from the source whose candle power is to be measured. The illumination upon the test plate is accordingly measured in the manner hereinbefore described by means of the illuminometer, and the value of the illumination is read in foot-candles on the illuminometer scale. This value read upon the scale is then multiplied by the square of the known distance in feet of the test plate from the light source, and this product gives the candle power of the light source in the direction observed.

To measure brightness the test plate may be dispensed with and the surface whose brightness is to be determined may be observed through the telescope either by correcting the scale reading by a factor representing the reflection co-efficient of the test plate that had been used in determining the current through lamp 15 or by changing the value of this current to allow for the absorption of the test plate. In either case the instrument may be made to give the brightness of the observed surface either in candle power per square inch or other units.

What we claim is:

1. Photometric standardization apparatus comprising a light excluding housing, a light source therein, said housing having an aperture through which light from said source may impinge directly upon a surface, and means for observing the illumination of such surface by light from said source transmitted through said surface or reflected therefrom.

2. Photometric standardization apparatus comprising a light excluding housing, a reference standard light source therein, said housing having an aperture through which light from said source may impinge upon a surface, said housing having a chamber whose axis is at an acute angle with the light from said light source to said surface, and means for viewing said surface through said chamber.

3. Photometric standardization apparatus comprising a light excluding housing, a reference standard light source therein, said housing having an aperture through which light from said source may impinge upon an external surface, said housing having a chamber whose axis is at an acute angle with the light from said light source to said surface, and an illuminometer having a sighting aperture registering with said chamber.

4. Photometric standardization apparatus comprising a light excluding housing, a reference standard light source therein, said housing having an aperture through which light from said source may impinge upon a surface, said housing having a chamber whose axis is at an acute angle with the line from said light source to said surface, a diaphragm intervening between said light source and said surface, and a diaphragm intervening between said surface and said chamber.

5. Photometric standardization apparatus comprising a light excluding housing, a light source therein, said housing having an aperture, a translucent test plate disposed at said aperture and receiving light from said source, and an illuminometer receiving light through said test plate.

6. Photometric standardization apparatus comprising a light excluding housing, a light source therein, said housing having an aperture, a translucent test plate disposed at said aperture and receiving light from said source, an illuminometer receiving light through said test plate, and means for adjusting said light source with respect to said aperture.

7. Photometric standardization apparatus comprising a light excluding housing, a light source therein, a test plate upon which light from said source impinges, said housing having an aperture through which said test plate is visible at an angle preventing specular reflection.

8. Photometric standardization apparatus comprising a light excluding housing, a light source therein, a test plate upon which light from said source impinges, said housing having an aperture through which said test plate is visible, and an illuminometer receiving light from said test plate through said aperture.

9. Photometric standardization apparatus comprising a light excluding housing, a light source therein, a test plate upon which light from said source impinges, said housing having an aperture through which said test plate is visible at an angle preventing specular reflection, and means for adjusting the distance between said light source and said test plate.

10. Photometric standardization apparatus comprising a light excluding housing, a light source therein, means for removably holding a test plate in said housing in such position that light from said source will fall thereon, and an opening in said housing through which the reflecting surface of said test plate may be viewed, the angle made by the line of sight through said opening to the center of said light field upon said test plate and the line connecting the center of the light field upon the plate with the light source being such as to prevent direct or specular reflection and less than ninety degrees.

11. Photometric standardization apparatus comprising a light excluding housing having communicating chambers, a light source in one of said chambers, means for removably holding a test plate in the communicating portion of said chambers and in a plane normal to the axis of said one of said chambers, means located at the remote end of the other of said chambers for observing said test plate, and an apertured diaphragm in each of said chambers, the angle between the axis of said chambers being acute.

12. Photometric standardization apparatus comprising a light excluding housing having communicating chambers, a standard light source in the first of said chambers, means for adjusting the position of said light source in said chamber including movable means external to the chamber, means for removably holding a test plate in the communicating portion of said chambers, an illuminometer comprising a light source to be standardized by comparison with said standard light source, and means for removably holding said illuminometer in place at the end of the second chamber remote from said test plate, the axes of said chambers forming an acute angle with each other.

13. Photometric standardization apparatus comprising a light excluding housing, a standard light source therein, means for removably holding a test plate in said housing in a position to receive light from said source, an illuminometer comprising a light source to be standardized removably held in said housing in such position as to receive light from said test plate, and means for preventing light from said source from falling directly upon said illuminometer, the angle between the ray which is incident upon the center of the field of observation upon said test plate and the line of observation being different than twice the angle of incidence of said ray, and the angle between the line of observation and the normal to said test plate being less than ninety degrees.

14. Photometric standardization apparatus comprising a light excluding housing, a standard light source therein, an opening in the wall of said housing, means for removably holding a test plate at said opening, a second opening in the wall of said housing opposite the first, means in said housing for screening said second opening from the direct rays of light from said source, said openings and said source being so located that the line passing through the centers of the openings makes an acute angle with the line connecting the center of said first opening with said light source.

15. Photometric standardization apparatus comprising a light excluding housing, a standard light source therein, an opening in the wall of said housing, means for removably holding a test plate at said opening, a second opening in the wall of said housing opposite the first, means in said housing for screening said second opening from the direct rays of light from said source, said openings and said source being so located that the line passing through the centers of the openings makes an acute angle with the line connecting the center of said first opening with said light source, an apertured diaphragm between said openings, an apertured casing for said source, said casing and source being movable toward and from said first opening, and means for moving said casing and said lamp comprising movable means external to the housing.

16. Photometric standardization apparatus comprising a light excluding housing, a standard light source therein, an opening in the wall of said housing, a translucent plate removably held at said opening in such position as to receive light from said source, means for removing said light source to vary its distance from said plate, consisting of a screw-threaded rod, one end of which rests in a bearing upon the inner wall of the housing, and the other end of which projects through said housing, means on the outer end of said rod whereby the same may be turned, a support for said light source having a screw-threaded portion the threads of which engage the threads of said rod, a spring element normally pressing said support toward said opening, a light excluding casing carried by said support, an aperture in said casing in line with said light source and said plate through which light from said source may pass, and an apertured diaphragm between said plate and said source and near said plate, whereby the quantity of light emitted by said standard light source and incident upon said plate may be adjusted with great precision.

17. Photometric standardization apparatus comprising a light excluding housing, a standard light source therein, means for removably holding a test plate in said housing in a position to receive light from said source, an illuminometer comprising a casing having an eye-piece at one end and containing a Lummer Brodhun cube, the opposite end being adapted to fit into an opening in said housing, said casing having an extension at one side opposite the cube, a light source to be standardized adjustably held in said extension, means for removably holding said illuminometer in said opening in said housing in such position that said test plate will lie in the field of observation of said illuminometer, the angle between the ray which is incident upon the center of the field of observation upon said test plate and the line of observation being different than twice the angle of incidence of said ray, and the angle between the line of observation and the normal to said test plate being less than ninety degrees.

18. Photometric standardization apparatus comprising a light excluding housing, a standard light source therein, means for removably holding a test plate in said housing in a position to receive light from said source, an illuminometer comprising a casing having an eye-piece at one end and containing a Lummer Brodhun cube, the opposite end being adapted to fit into an opening in said housing, said casing having an extension at one side opposite the cube, a light source to be standardized adjustably held in said extension, and means for removably holding said illuminometer in said opening in said housing in such position that said test plate will lie in the field of observation of said illuminometer.

In testimony whereof we have hereunto affixed our signatures this 25th day of March, 1915.

NORMAN MACBETH.
IRVING B. SMITH.